Oct. 31, 1961 J. McEWAN 3,006,222
APPARATUS FOR SHARPENING CHAIN SAWS
Filed Dec. 20, 1957 3 Sheets-Sheet 1
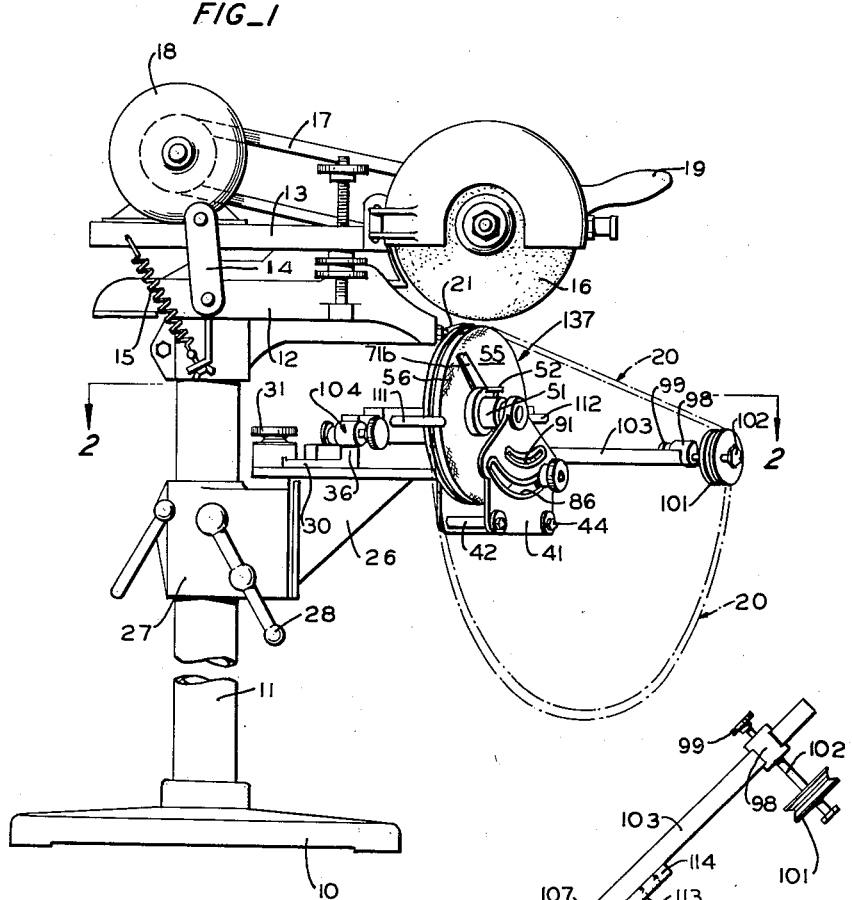
INVENTOR.
JAMES McEWAN
BY
ATTORNEYS Oct. 31, 1961
J. McEWAN
3,006,222
APPARATUS FOR SHARPENING CHAIN SAWS
Filed Dec. 20, 1957
3 Sheets-Sheet 2
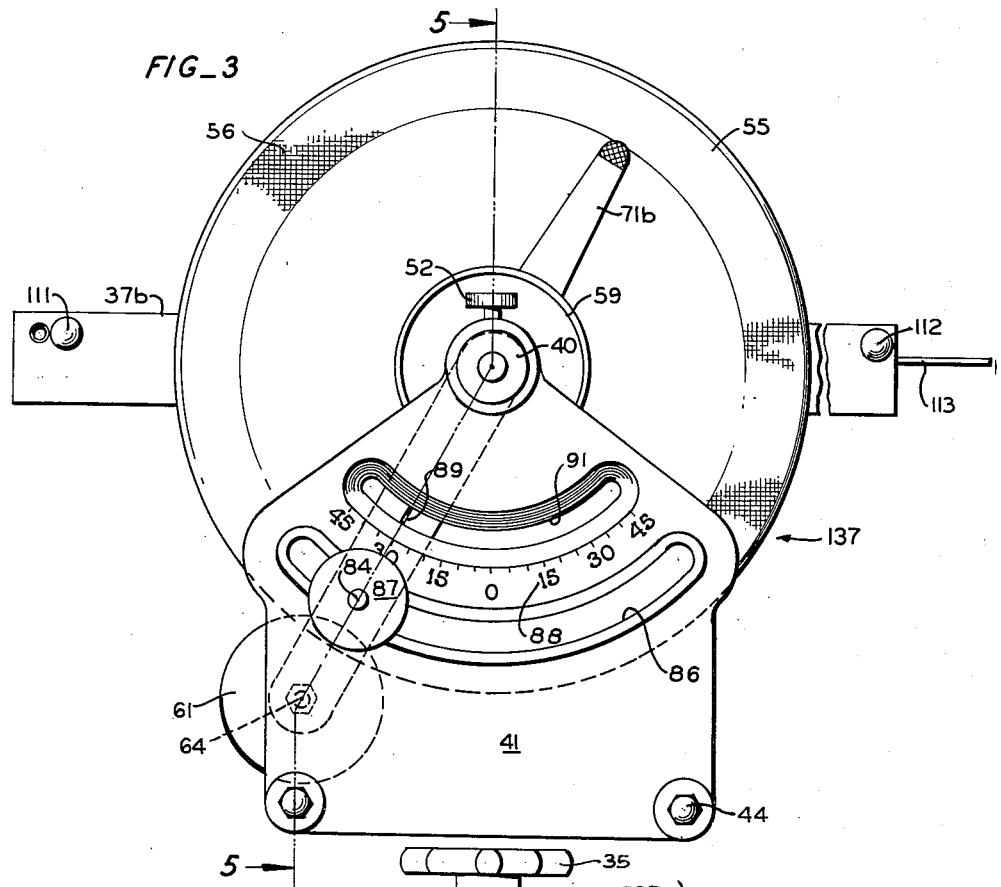
FIG_3
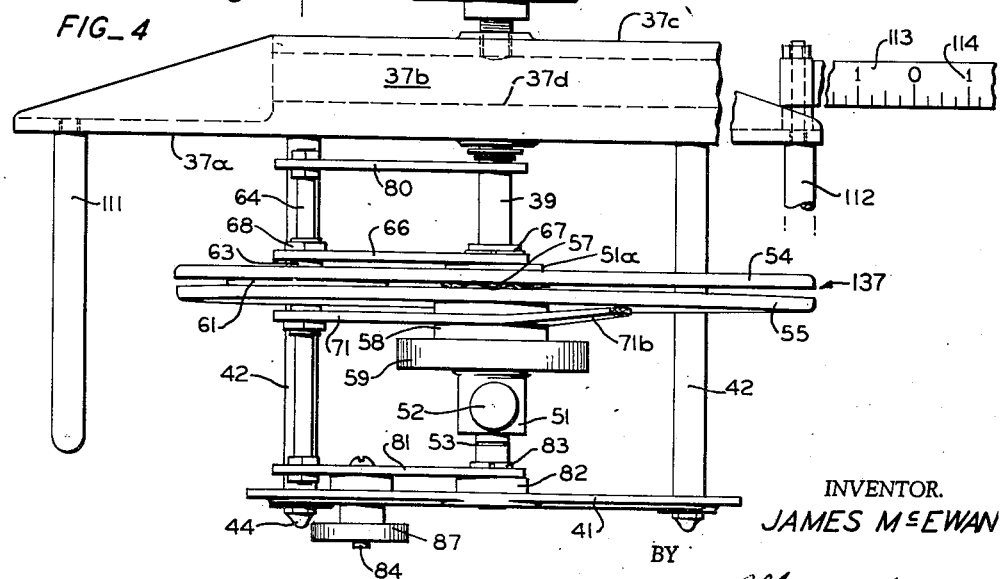
FIG_4
INVENTOR.
JAMES McEWAN
BY
*Allen and Chromy*
ATTORNEYS

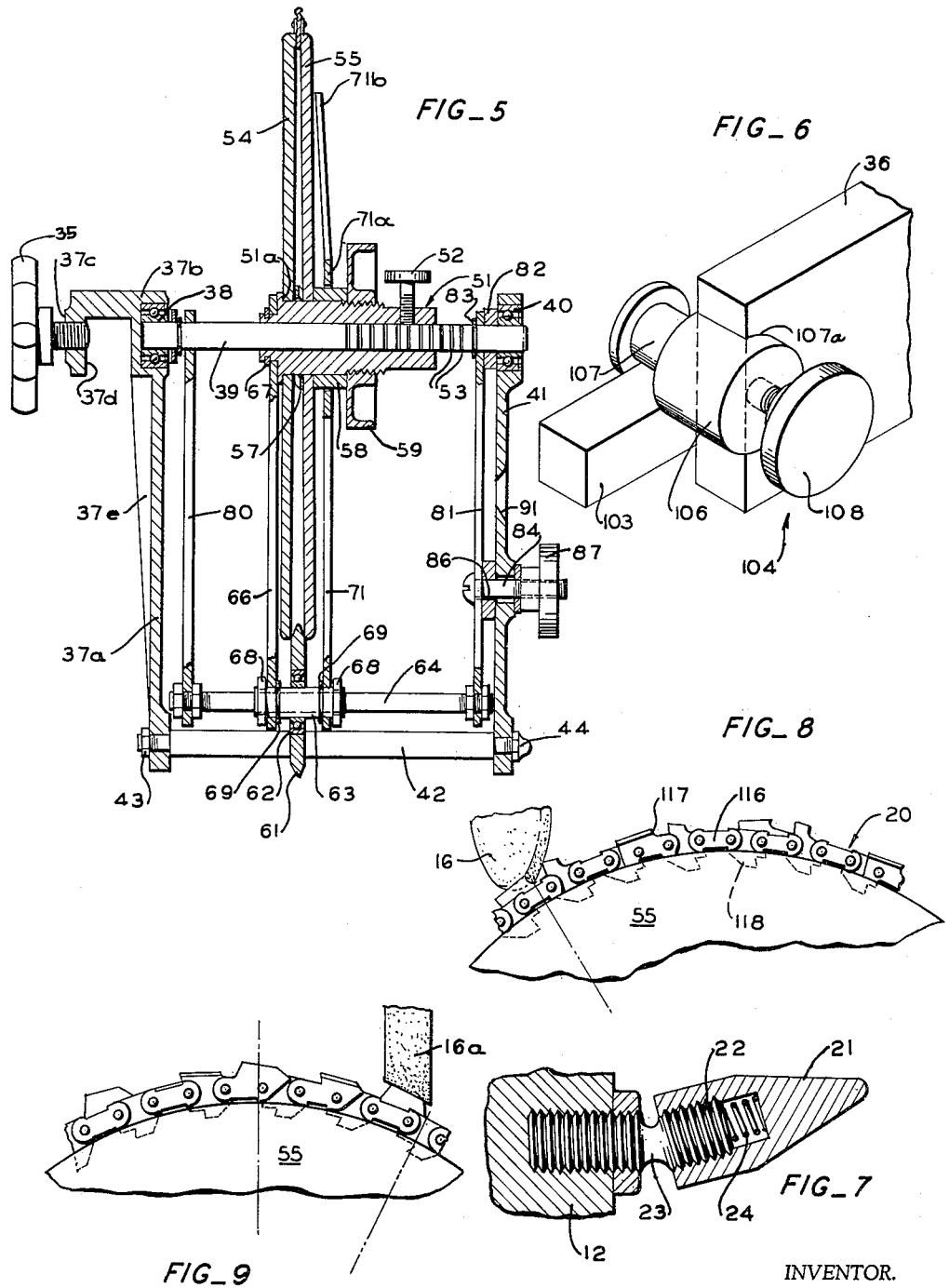

3,006,222
APPARATUS FOR SHARPENING CHAIN SAWS
James McEwan, 138 Stockton Ave., San Jose, Calif.
Filed Dec. 20, 1957, Ser. No. 704,093
13 Claims. (Cl. 76—37)

The present invention relates to apparatus for sharpening chain saws, and is concerned more particularly with improved apparatus of this character whereby the teeth of the chain saws can be sharpened in succession rapidly without the requirement of intermittent resetting or adjustment of any part of the mechanism during the operation of sharpening a complete set of teeth on one side.

Previous sharpeners for chain saws have been limited in their usefulness by the requirement for repeatedly releasing and reclamping the chain saw in different sections during the sharpening operation. In accordance with the instant invention, provision is made for continuously clamping the links of the chain of the chain saw without effort or attention by the operator other than moving the particular tooth of the saw to be sharpened into sharpening position.

It is therefore a general object of the invention to provide improved apparatus for the sharpening of the teeth of chain saws.

It is a further object of the invention to provide apparatus of the above character in which continuously operated clamping means are provided which receive and clamp the successive links of the chain as the corresponding teeth are moved into sharpening position.

A further object of the invention is to provide a sharpener of the above character in which the angular relation of the saw to the sharpening element can be readily and easily adjusted.

A further object of the invention is to provide a continuous or endless clamp for holding the chain of a chain saw as it is moved without the necessity for adjustment or attention during such movement.

Still another object of the invention is to provide an automatic endless clamp for a chain saw in which the chain is continuously fed into a chain receiving opening in the clamp, then fed to clamping position, and then continuously discharged or disengaged on the other side of the point of a clamping engagement after the sharpening of a tooth.

Other objects and advantages of the invention will be apparent from the following description of a preferred embodiment thereof, taken in connection with the accompanying drawings, in which:

FIG. 1 is a side elevational view of a sharpener for a chain saw;

FIG. 2 is a sectional plan view taken in a plane indicated by the line 2—2 in FIG. 1;

FIG. 3 is a side elevational view of the clamp or clamping attachment for the chain saw;

FIG. 4 is a plan view of the attachment;

FIG. 5 is a sectional view taken in planes indicated generally by the line 5—5 of FIG. 3;

FIG. 6 is a perspective view illustrating the clamping means for the fair lead support;

FIG. 7 is a fragmentary sectional view illustrating the construction of the conventional saw supporting and bracing pin for use with conventional circular saws;

FIG. 8 is a fragmentary view illustrating the relation of the sharpening element to the teeth of one type of chain saw; and FIG. 9 is a fragmentary view illustrating another form of sharpening element in operative relation to the teeth of another type of chain saw.

Referring to FIG. 1, the chain saw sharpener includes a base 10 from which an upright post or standard 11 projects to receive at the top a mounting bracket and dust chute 12 upon which a movable frame 13 is pivotally mounted by means of parallel links 14. On this movable frame 13 there is provided a sharpening element 16, shown herein as a grinding wheel, which is driven through a belt 17 from an electric motor 18. A handle 19 is provided for moving the grinding wheel 16 to and from its sharpening position. The frame 13 is shown in its lower or active position with the sharpening element or wheel 16 in operative relation to a chain saw 20 where it is held manually against the urgency of the spring 15, which normally maintains the frame 13 in elevated position. The linkage control for the movement of the grinding wheel 16 is such that its up and down movement is substantially linear.

Immediately below the grinding wheel 16 there is a stop 21 against which the element to be sharpened can be positioned for accurate adjustment. As seen in FIG. 7, the stop 21 is threaded internally to engage over an upwardly bent threaded end 22 of a stud 23 threaded into the bracket 12 and locked in place by a suitable lock nut. A spring 24 yieldably maintains the stop 21 in its adjusted position on the threaded end 22 of its supporting stud.

Associated with the post 11 (FIGS. 1 and 2) is a saw support 26, which has its boss 27 slidably engaged and clamped in adjusted position by a locking handle 28 to control the vertical relation of the saw support 26 with respect to the grinding wheel 16. This saw support 26 includes a table 30 which can be rotated to change the angularity of the saw support with respect to the grinding wheel, and its angularity can be seen on the scale 33 in FIG. 2. The table 30 can be clamped in a selected position by clamping means 31. The table 30 includes an upstanding rail 36. The above parts are conventional and are of the type shown in my Patent No. 2,590,992, dated April 1, 1952. Upon the rail 36 there is received a clamping attachment 137 for a chain saw.

This saw clamping attachment 137 is of a continuous or endless type and has means for receiving, then clamping and subsequently releasing the chain links of the chain saw as the teeth of the chain saw are fed to and then past a sharpening point which can be adjusted or located as required. This clamping attachment comprises generally a frame or a casting 37 having a vertically extending plate portion 37a depending from a thickened pad or portion 37b, and transversely extending flange 37c spaced from the pad 37b to form a slot 37d adapted to engage over the rail 36 of the saw support. A clamping screw 35 is threaded in flange 37c to engage the rail 36. Tapered vertical ribs 37e extend downwardly from adjacent the inner edge of the slot 37d to enable easy entrance of the rail 36 into the slot.

Centrally of the frame 37 (FIG. 5), its pad 37b is recessed to provide a mounting for a bearing 38 for one end of a support shaft 39, a retaining washer and a retaining clip being provided on a shaft 39 adjacent the bearing 38. The other end of the shaft 39 is journalled by means of a bearing 40 in an outer plate 41 (FIGS. 3 and 5). The lower end of this outer plate 41 is secured to the frame plate 37a by a pair of similar spacer rods 42 having their reduced threaded ends received respectively in the frame plate 37a and the outer plate 41 and secured thereto by respective nuts 43 and 44.

The shaft 39 (FIGS. 3–5) provides a rotatable support for continuous or endless saw clamping means and for this purpose slidably and rotatably mounts a sleeve 51 (FIG. 5) which may be adjustably clamped in position by a knurled set screw 52, the position being indicated by a series of graduations 53 on the shaft 39. The sleeve 51 is a mounting sleeve for a pair of endless clamping elements or discs 54 and 55, the disc 54 being press-fitted onto the sleeve 51 against a flange 51a therof, and the disc 55 being loosely mounted thereon and capable of tilting with respect thereto. The disc 54 and 55 are knurled at 56 for sure gripping and also have interposed therebetween a corrugated spring washer 57 to yieldably maintain them apart. Also associated with the disc 55 is a clamping sleeve 58 and a clamping collar or nut 59 engaging a threaded portion of the sleeve 51.

The clamping element or discs 54 and 55 (FIG. 5) are thus mounted in axially misaligned position with respect to each other to enable clamping of a saw tooth at a particular circumferential position as controlled by means to be described, and to provide a tapered entrance slot and a corresponding tapered exit slot for the links of the chain.

To control the point of area of clamping of the saw chain about the circumference of the clamping discs 54 and 55, a rotatable control wheel 61 (FIGS. 3 and 5) is provided journalled by a bearing 62 on a sleeve 63 slidably mounted on a shaft 64. The sleeve 63 is positioned by an arm 66 which is rotatably engaged with the sleeve 51 and is held on a reduced portion thereof by a retainer ring 67. At its lower end the arm 66 is secured to the sleeve 63 by a nut 68 and a retainer clip 69. At the other end of the sleeve 63 there is secured by a similar nut 68 and retainer 69 an arm 71 which has an enlarged ring portion 71a disposed loosely about the clamping sleeve 58 and continues upwardly to a pointer portion 71b (FIGS. 3 and 5) which is diametrically opposite to the position of the wheel 61 and thereby indicates the location of the closest spacing or clamping point of the discs 54 and 55.

The shaft 64 (FIGS. 3 and 5) is supported at its ends by a pair of arms 80, 81 which extend upwardly and are apertured to engage over and pivot on the shaft 39, the arm 81 being held in place by a spacer 82 and a ring 83. Intermediate its ends the arm 81 carries a stud 84 which extends through an arcuate slot 86 of the outer plate 41 and is threaded to carry a clamping nut 87. The plate 41 carries a series of graduations 88 which cooperate with an indicator line 39 on the arm 81 and is viewed through a second arcuate slot 91 in the plate 41.

In controlling the clamping engagement of the plates 54 and 55, the wheel 61 (FIG. 5) has a tapered outer periphery for easier guiding entrance into position between the plates 54 and 55 but the edges of the plates actually seat and turn against parallel wall portions of the wheel 61.

To assist in positioning of the chain saw with respect to the clamping attachment, the attachment includes a fair lead or pulley 101 (FIGS. 1 and 2) carried by a shaft 102 secured at one end of a rectangular bar 103 by a clamping element 98 and a set screw 99, similar to the element 104 described later. The bar 103 is slidably mounted on the table 30 adjacent the upstanding rail 36. To releasably secure the bar 103 in place a pair of similar clamping elements 104 are provided at either end of the rail 36 and these clamping elements 104 each include a clamping member or sleeve 106 (FIG. 6) having a reduced portion 107 to engage the bar 103 and having a milled groove 107a to receive the rail 36. A set screw 108 is threaded into one end of the sleeve 106 and abuts the face of the rail 36.

As will be described later in connection with the operation of sharpening, the clamping attachment is sometimes displaced laterally with respect to the grinding wheel 16, being displaced to one side for the sharpening of one set of alternate teeth of the saw and being displaced to the other side for the sharpening of the other alternate set of teeth. To aid in the sharpening operation, a pair of hand rests 111 and 112 (FIGS. 2 and 4) are provided at the ends of the frame 37 and the support 112 is extended through the frame 37 to provide a pivotal mounting for a scale bar 113 having graduations 114 reading in either direction from a central "zero" mark which is read with reference to the adjacent end of the rail 36 as an index.

From the above description it will be seen that the scale bar 113 can be moved between an extended position as shown in the drawings and a retracted position where it has been pivotally moved to extend inwardly of the arm rest 113 and thus be in a more convenient position for handling or packing for shipment.

The operation of the sharpening apparatus will be described first with reference to a chain saw of the type shown in FIG. 8 where the chain includes links 116, saw teeth 117 and inner projections 118 which are adapted to be clamped between the discs 54 and 55, the saw teeth 117 as explained face alternately in opposite directions and each alternate set is sharpened as one continuous operation. To prepare for the sharpening operation, the clamping attachment is adjusted along the rail 36 to one side of center to a position indicated on the scale 113, and the angularity of the saw attachment is adjusted by adjusting the table 30 to the desired angularity as indicated by the scale 33. The discs 54 and 55 and their mounting sleeve 51 are then adjusted along the shaft 39 to the proper position and the clamping screw 52 is tightened to hold this position. Also, the control wheel 61 is set to obtain the proper area or point of clamping or gripping by the discs 54 and 55. The chain 20 is then placed in engagement with its inner projections 118 between discs 54 and 55 and the clamping collar 59 is tightened to obtain the proper holding action on the projections 118 adjacent the point of tightest clamping or closest approach of the discs 54 and 55 as determined by adjustment of the clamp controlling wheel 61 as read on the scale 38.

With the parts thus adjusted the operator brings the grinding wheel into contact with the edge of the tooth to be sharpened, for example as shown in FIG. 8, until appropriate sharpness is attained. The grinding wheel is then lifted and the next alternate tooth, i.e., the next tooth facing in the same direction is brought into operative position by manual rotation of the clamping discs 54 and 55. This operation continues until one alternate set of teeth is sharpened.

Referring to FIG. 9 there is shown another type of chain saw in which a bevelled grinding wheel 16a is employed to engage the outer face of the tooth and perform the sharpening operation.

In chain saws alternate cutting teeth face in opposite lateral directions so that it is the common practice to feed the chain and sharpen every other tooth with one angular setting both of the plane of the clamping discs 54 and 55 with respect to the plane of the grinding wheel 16, and also with respect to the angle of engagement of the control wheel 61 with reference to the clamping discs 54 and 55 themselves. Some operators prefer after sharpening one set of alternate teeth to shift the attachment on the rail 36 and re-adjust its angle to obtain an opposite angle of the clamping discs 54 and 55 with respect to the grinding wheel 16, while others prefer to leave the clamping attachment at the same position on the rail 36 and merely re-adjust the angle of the attachment with respect to the wheel 16 for sharpening the other set of oppositely facing alternate teeth.

While I have shown and described a preferred embodiment of my invention, it will be apparent that the invention is capable of variation and modification from the form shown so that the scope thereof should be limited only by the scope of the claims appended hereto.

What I claim is:

1. In a sharpener for a chain saw, a frame, a sharpening element mounted on the frame for movement between an inactive position and an active sharpening position, saw holding means on said frame including a saw support comprising two discs in side-by-side relation, said discs being mounted about axes at a slight angle to each other whereby at one portion of their periphery the discs are urged together at a saw clamping position adjacent to the active position of the sharpening element.

2. In a sharpener for a chain saw, a frame, a sharpening element mounted on the frame for movement between an inactive position and an active sharpening position, saw holding means on said frame including a saw support comprising two discs in side-by-side relation, said discs being mounted for relative tilting movement whereby at one portion of their periphery the discs may be urged together in a saw clamping position adjacent to the active position of the sharpening element, and settable means for urging said discs together at one region of their periphery.

3. A chain saw holding clamp comprising a support element, a pair of discs arranged on said support element in side-by-side relation, means for controlling movement of said discs whereby at one portion of their periphery the discs tend to come together in saw clamping position, and means for holding said discs in saw clamping position, whereby upon rotation of the discs successive portions of the periphery thereof are passed through said saw clamping position.

4. A saw clamp as recited in claim 3 in which a separating element is engaged with said discs, and means is provided mounting said element for adjustment about the axes of said discs.

5. A chain saw holding clamp comprising a support element, a pair of discs arranged on said support element in side-by-side relation about axes at a slight angle to each other, whereby at one portion of their periphery the discs tend to come together in saw clamping position, and rotatable means for holding said discs in saw clamping position whereby upon rotation of the discs successive portions of the periphery thereof are passed through said saw clamping position.

6. A holder for a chain saw comprising a frame, a pair of endless holding elements for engaging the chain saw, said holding elements being mounted on said frame for movement past a sharpening position, and means for effecting converging of said elements in holding relation at said sharpening point as said elements are advanced.

7. In a holder as recited in claim 6, including means for selecting the region of converging of said elements, and means for holding said selecting means in adjusted position.

8. In a sharpener for a chain saw, a frame, a sharpening element mounted on the frame for movement between an inactive position and an active sharpening position, a table, including an upstanding rail, means mounting the table on said frame for rotative adjustment, a chain saw holding claimp slidably mounted on said rail and including a pair of discs rotatably mounted in side-by-side relation and about axes having a slight angle to each other, whereby at one portion of their periphery the discs converge at a saw clamping position, said clamp also including a scale reading in both directions from a central zero graduation and positioned to be read against an index on said rail to indicate the laterally displaced position of the clamp to either side of said sharpening element.

9. In a sharpener as recited in claim 8 in which mounting means is provided on said clamp for said scale to provide an operative extended position thereof and an inoperative position thereof in which it is in overlapping relation with said clamp.

10. In a sharpener for a chain saw, a frame, a sharpening element mounted on the frame for movement between an inactive position and an active sharpening position, a table, including an upstanding rail, means mounting the table on said frame for rotative adjustment, a chain saw holding clamp slidably mounted on said rail and including a pair of discs rotatably mounted in side-by-side relation and about axes having a slight angle to each other, whereby at one portion of their periphery the discs converge at a saw clamping position, a bar mounted for sliding movement on said table to be in projecting position with respect to said clamp, and a pulley journalled on said bar providing a fair lead for support of a chain saw engaged with said discs.

11. A holder for a chain saw comprising a frame including a projecting pad portion and having a depending flange spaced from the frame to provide a mounting slot, a shaft journalled on said frame and projecting therefrom, a bracket disposed parallel to said frame and spaced therefrom, support means for said bracket on said frame, journal means in said bracket for the other end of said shaft, a sleeve slidably and rotatably mounted on said shaft between said frame and said bracket, a pair of saw clamping discs mounted on said sleeve about slightly different axes whereby one portion of said discs converge in saw clamping relation, an arm pivoted on said sleeve, control means carried by said arm and related to said discs for determining the region of clamping thereof, a rod slidably and rotatably engaged with said control means, a pair of arms supporting said rod and extending upwardly therefrom and journalled on said shaft, means providing an arcuate slot in said bracket, and a control element extending through said slot for manual positioning of said roller means.

12. A holder for a chain saw comprising a frame including a projecting pad portion and having a depending flange spaced from the frame to provide a mounting slot, a shaft journalled in said frame and projecting therefrom, a bracket disposed parallel to said frame and spaced therefrom, support means for said bracket on said frame, journal means in said bracket for the other end of said shaft, a sleeve slidably and rotatably mounted on said shaft between said frame and said bracket, a pair of saw clamping discs mounted on said sleeve about slightly different axes whereby one portion of said discs converge in saw clamping relation, a depending arm pivoted on said sleeve, roller means carried by said arm and interposed between said discs for determining the region of clamping thereof, a shaft slidably and rotatably engaged with said roller, a pair of arms supporting said shaft and extending upwardly therefrom and journalled on said first named shaft, means providing an arcuate slot in said bracket, and a control element extending through said slot for manual positioning of said roller means.

13. A holder for a chain saw comprising a frame is-cluding a projecting pad portion and having a depending flange spaced from the frame to provide a mounting slot, a shaft journalled in said frame and projecting therefrom, a bracket disposed parallel to said frame and spaced therefrom, support means for said bracket on said frame, journal means in said bracket for the other end of said shaft, a sleeve slidably and rotatably mounted on said shaft between said frame and said bracket, releasable means for securing said sleeve to said shaft, a pair of saw clamping discs mounted on said sleeve about slightly different axes whereby one portion of said discs converge in saw clamping relation, a depending arm pivoted on said sleeve, roller means carried by said arm and interposed between said discs for determining the region of clamping thereof, a shaft slidably and rotatably engaged with said roller, a pair of arms supporting said shaft and extending upwardly therefrom and journalled on said first named shaft, means providing an arcuate slot in said bracket, a control element extending through said slot for manual positioning of said roller means, and other releasable means for securing said element and said roller means in a selected position.

References Cited in the file of this patent

UNITED STATES PATENTS

| | | |
|---|---|---|
| 1,771,840 | Brown | July 29, 1930 |
| 2,217,145 | Stihl | Oct. 8, 1940 |
| 2,447,298 | Whitlock | Aug. 17, 1948 |
| 2,459,233 | Mall | Jan. 18, 1949 |
| 2,793,544 | Rogers | May 28, 1957 |
| 2,811,874 | Rethout | Nov. 5, 1957 |
| 2,824,468 | Nielsen | Feb. 25, 1958 |